United States Patent
Amagai et al.

(10) Patent No.: US 6,197,226 B1
(45) Date of Patent: Mar. 6, 2001

(54) PROCESS FOR TINTING A RESIN HAVING A LARGE REFRACTIVITY INDEX AND OPTICAL MATERIAL TINTED BY THE PROCESS

(75) Inventors: Akikazu Amagai; Motoharu Takeuchi; Katsuyuki Mizuno; Atsuki Niimi; Hiroshi Horikoshi, all of Tokyo (JP)

(73) Assignee: Mitsubishi Gas Chemical Company, Tokyo (JP)

( * ) Notice: Subject to any disclaimer, the term of this patent is extended or adjusted under 35 U.S.C. 154(b) by 0 days.

(21) Appl. No.: 09/221,939

(22) Filed: Dec. 28, 1998

(30) Foreign Application Priority Data

Jan. 5, 1998 (JP) .................................................. 10-000320

(51) Int. Cl.⁷ .................................................... B29D 11/00
(52) U.S. Cl. ................................... 264/1.1; 8/507; 8/509; 351/159; 351/177
(58) Field of Search ............................ 524/157; 351/159, 351/177; 264/1.1; 8/507, 509

(56) References Cited

U.S. PATENT DOCUMENTS 3,963,806 * 6/1976 Dornte ................................. 260/874

* cited by examiner

Primary Examiner—Paul R. Michl
(74) Attorney, Agent, or Firm—Frishauf, Holtz, Goodman, Langer & Chick, P.C.

(57) ABSTRACT

A process for tinting a resin and a tinted optical material produced by the process. The process comprising dipping a resin into a liquid containing at least one compound selected from the group consisting of polar inorganic compounds and polar organic compounds and subsequently tinting the resin, wherein the resin is obtained by curing by polymerization of a sulfur-containing compound alone or a composition comprising the sulfur-containing compound, the sulfur-containing compound having in the molecule thereof one or more structures represented by the following formula

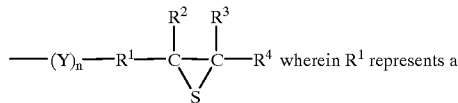

hydrocarbon group having 1 to 10 carbon atoms, $R^2$, $R^3$ and $R^4$ each represents a hydrogen atom or a hydrocarbon group having 1 to 10 carbon atoms, Y represents S or O and n represents 0 or 1.

20 Claims, No Drawings

PROCESS FOR TINTING A RESIN HAVING A LARGE REFRACTIVITY INDEX AND OPTICAL MATERIAL TINTED BY THE PROCESS

BACKGROUND OF THE INVENTION

1. Field of the Invention

The present invention relates to a process for producing an optical material such as a plastic lens, a prism, an optical fiber, a substrate of information recording materials and a filter, and more particularly, to a process for producing a plastic lens of glasses.

2. Description of the Related Arts

Plastic materials have widely been used as various optical materials, particularly as lenses of glasses, because their of light weight, toughness and easiness of tinting. The properties required for optical materials, particularly for lenses of glasses, are a low specific gravity, optical properties such as a large refractive index and a large Abbe number and physical properties such as high heat resistance and high strength. A large refractive index is important to decrease thickness of a lens. A large Abbe number is important to decrease the chromatic aberration of a lens. High heat resistance and high strength are important to facilitate fabrication and also from the standpoint of safety.

As conventional materials having a large refractive index, thermosetting optical materials having a thiourethane structure which are obtained by the reaction of a polythiol compound and a polyisocyanate compound have been proposed (Japanese Patent Publication Heisei 4(1992)-58489 and Japanese Patent Application Laid-Open No. Heisei 5(1993)-148340). Technology to obtain a lens by polymerization of an epoxy resin or an epithio resin with a multifunctional compound have also been proposed in the specifications of Japanese Patent Application Laid-Open No. Heisei 1(1989)-98615, Japanese Patent Application Laid-Open No. Heisei 3(1991)-81320 and International Publication No. WO8910575. Of course, optical materials having further large refractive indices are desirable. A small chromatic aberration is another important property required for an optical material. The larger the Abbe number, the smaller the chromatic aberration. Therefore, a material having a large Abbe number is also desirable. Thus, a material having both a large refractive index and large a Abbe number is desired.

However, the Abbe number tends to decrease with an increase in the refractive index. Plastic materials obtained from conventional compounds have the maximum Abbe number of about 50 to 55 when the refractive index is 1.50 to 1.55, about 40 when the refractive index is 1.60 and about 31 when the refractive index is 1.66. When the refractive index is forced to increase to 1.70, the Abbe number decreases to 30 or less and the obtained material cannot practically be used.

To solve the above problems, the present inventors discovered novel sulfur-containing compounds having an epithio structure from which optical materials having a small thickness and a decreased chromatic aberration, i.e., a refractive index of 1.7 or more and an Abbe number of 35 or more, can be obtained (Japanese Patent Application No. Heisei 8(1996)-214631 and Japanese Patent Application No. Heisei 8(1996)-5797). However, the optical materials described in the above applications do not show a sufficient tint performance and further improvement has been desired. It has been found that an optical material obtained by curing by polymerization of a composition comprising a sulfur-containing compound and a compound having a polar group shows an improved tint performance (Japanese Patent Application No. Heisei 9(1997)-333120). However, this material has a drawback in that components other than the compound having an epithio structure must be added in large amounts to exhibit a further improved tint performance and the refractivity index decreases markedly. For example, the refractivity index decreases to about 1.65 when the tint performance is raised to 75% (the transmittance of light of 25% after tinting). Moreover, a sufficient effect of improvement cannot be obtained in accordance with conventional tinting technologies in which various types of carriers such as aromatic compounds, phenol compounds, alcohols, carboxylic acids, and esters of carboxylic acids and various types of surfactants are used. Thus, a novel technology has been desired in order to tint an optical material having a sufficiently high refractivity index and a sufficiently high Abbe number which is obtained by polymerization of a compound having an epithio structure or a composition comprising the compound.

SUMMARY OF THE INVENTION

The present invention has an object to provide a process for tinting a resin obtained by curing by polymerization of a sulfur-containing compound having an epithio structure or a composition comprising the compound and to obtain a tinted optical material exhibiting an excellent balance between a sufficiently high refractivity index and a sufficiently high Abbe number which has heretofore not been obtained.

Accordingly, the present invention provides (1) a process for tinting a resin comprising dipping the resin into a liquid containing at least one compound selected from the group consisting of polar inorganic compounds and polar organic compounds and subsequently tinting the resin, wherein the resin is obtained by curing by polymerization of a compound alone or a composition comprising the compound, the compound having in the molecule thereof one or more structures represented by the following formula (1):

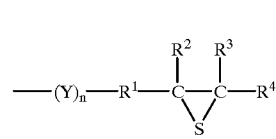

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, Y represents S or O and n represents 0 or 1.

The present invention also provides (2) a process for tinting a resin comprising dipping the resin into a liquid containing at least one compound selected from the group consisting of polar inorganic compounds and polar organic compounds and subsequently tinting the resin, wherein the resin is obtained by curing by polymerization of a compound alone or a composition comprising the compound, the compound having in the molecule thereof one or more structures represented by the following formula (2):

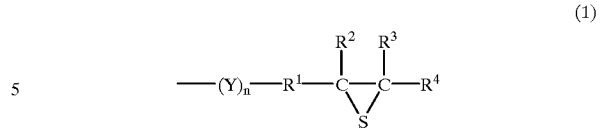

(1)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, Y represents S or O and n represents 0 or 1.

To obtain a high refractivity index, a high Abbe number and an excellent balance between these properties which are the object of the present invention, it is preferable that $R^1$ in formula (1) represents methylene group or ethylene group and $R^2$, $R^3$ and $R^4$ each represents a hydrogen atom or methyl group. It is more preferable that $R^1$ represents methylene group and $R^2$, $R^3$ and $R^4$ each represents a hydrogen atom. As the compound having in the molecule thereof one or more structures represented by formula (1), which is used in the present invention, any compound satisfying this condition can be used. The compound preferably has an average number of the structure represented by formula (1) of 1.3 or more and more preferably 2 or more in one molecule. Examples of the compound having one or more structures represented by general formula (1) in one molecule include the following compounds:

(A) Organic compounds having one or more epithio groups (B) Organic compounds having one or more epithioalkyloxy groups (C) Organic compounds having one or more epithioalkylthio groups Organic compounds (A), (B), and (C) have a chain backbone structure, an alicyclic backbone structure, an aromatic backbone structure or a heterocyclic backbone structure having a nitrogen atom, an oxygen atom or a sulfur atom. The organic compounds may have a combination of epithio groups, epithioalkyloxy groups and epithioalkylthio groups in one molecule. The organic compound may also have sulfide linkages, ether linkages, sulfone linkages, ketone linkages, ester linkages, amide linkages or urethane linkages.

Preferable examples of the organic compound having one or more epithio groups of compound (A) include compounds obtained by replacing one or more epoxy groups in compounds having epoxy groups (not glycidyl groups) with epithio groups. Specific examples of the above compound include: organic compounds having a chain aliphatic backbone structure such as 1,1-bis(epithioethyl)methane, 1-(epithioethyl)-1-(β-epithiopropyl)methane, 1,1-bis(β-epithiopropyl)methane, 1-(epithioethyl)-1-(β-epithiopropyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane; organic compounds having an alicyclic backbone structure such as 1,3- and 1,4-bis(epithioethyl)cyclohexanes, 1,3- and 1,4-bis(β-epithiopropyl)cyclohexanes, bis[4-(epithioethyl)cyclohexyl]methane, bis[4-(β-epithiopropyl)cyclohexyl]

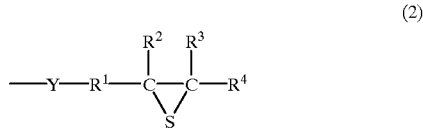

(2)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms and Y represents S or O.

The present invention further provides (3) a process for tinting a resin comprising dipping the resin into a liquid containing at least one compound selected from the group consisting of polar inorganic compounds and polar organic compounds and subsequently tinting the resin, wherein the resin is obtained by curing by polymerization of a compound alone or a composition comprising the compound, the compound having in the molecule thereof one or more structures represented by the following formula (3):

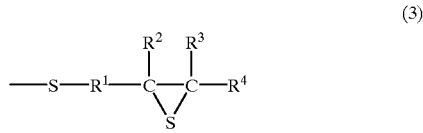

(3)

wherein $R^1$ represents a hydrocarbon group having 1 to 10 carbon atoms and $R^2$, $R^3$ and $R^4$ each represents a hydrogen atom or a hydrocarbon group having 1 to 10 carbon atoms.

The present invention further provides (4) a process for tinting a resin comprising dipping the resin into a liquid containing at least one compound selected from the group consisting of polar inorganic compounds and polar organic compounds and subsequently tinting the resin, wherein the resin is obtained by curing by polymerization of a compound alone or a composition comprising the compound, the compound being represented by the following formula (4):

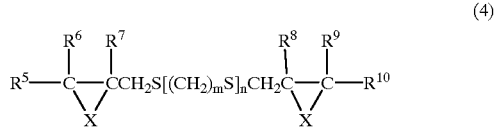

(4)

wherein $R^5$ to $R^{10}$ each represents a hydrogen atom or a hydrocarbon group having 1 to 10 carbon atoms, X represents S or O, an average number of S represented by X is 50% or more of a total number of S and O constituting the three-membered ring, m represents 1 to 6 and n represents 0 to 4.

The present invention further provides (5) a tinted optical material produced in accordance with the above processes.

DESCRIPTION OF THE PREFERRED EMBODIMENTS

The object of the present invention was achieved by the process for tinting a resin comprising dipping the resin into a liquid containing at least one compound selected from the group consisting of polar inorganic compounds and polar organic compounds and subsequently tinting the resin, wherein the resin is obtained by curing by polymerization of a compound alone or a composition comprising the compound, the compound having in the molecule thereof one or more structures represented by the following formula (1):

methane, 2,2-bis[4-(epithioethyl)cyclohexyl]propane, 2,2-bis[4-(β-epithiopropyl)cyclohexyl]propane, bis[4-(β-epithiopropyl)cyclohexyl] sulfide, bis[4-(epithioethyl)cyclohexyl] sulfide, 2,5-bis(epithioethyl)-1,4-dithiane, 2,5-bis(β-epithiopropyl)-1,4-dithiane, 4-epithioethyl-1,2-cyclohexene sulfide and 4-epoxy-1,2-cyclohexene sulfide; organic compounds having an aromatic backbone structure such as 1,3- and 1,4-bis(epithioethyl)benzenes, 1,3- and 1,4-bis(β-epithiopropyl)benzenes, bis[4-(epithoethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl] sulfide, bis[4-(β-epithiopropyl)phenyl] sulfide, bis[4-(epithioethyl)phenyl] sulfone, bis[4-(β-epithiopropyl)phenyl] sulfone, 4,4'-bis(epithioethyl)biphenyl and the like compounds and 4,4'-bis(β-epithiopropyl)biphenyl and the like compounds; and compounds obtained by replacing at least one hydrogen atom of the epithio group with methyl group.

Preferable examples of the organic compound having one or more epithioalkyloxy groups of compound (B) include compounds obtained by replacing one or more glycidyl groups in epoxy compounds derived from an epihalohydrin with epithioalkyloxy groups (thioglycidyl groups). Specific examples of the above epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary amines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl) ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalenediamines, 4,4'-diaminodiphenylmethane, 4,4'-diaminodiphenyl ether and 2,2-(4,4'-diaminodiphenyl)propane; epoxy compounds derived from amines which are produced by condensation of epihalohydrins with secondary amines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; and epoxy compounds of urethane produced from the above polyhydric alcohols, the above phenols, diisocyanates and glycidol.

More specific examples of compound (B) include: organic compounds having a chain aliphatic backbone structure such as bis(β-epithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane and 1,11-bis(β-epithiopropyloxy)-4,7-bis(β-epithiopropyloxymethyl)-3,6,9-trithiaundecane; organic compounds having an alicyclic backbone structure such as 1,3- and 1,4-bis(β-epithiopropyloxy)cyclohexanes, 1,3- and 1,4-bis(β-epithiopropyloxymethyl)cyclohexanes, bis[4-(β-epithiopropyloxy)cyclohexyl]methane, 2,2-bis[4-(β- epithiopropyloxy)cyclohexyl]propane, bis[4-(β-epithiopropyloxy)cyclohexyl] sulfide, 2,5-bis(β-epithiopropyloxymethyl)-1,4-dithiane and 2,5-bis(β-epithiopropyloxyethyloxymethyl)-1,4-dithiane; organic compounds having an aromatic backbone structure such as 1,3- and 1,4-bis(β-epithiopropyloxy)benzenes, 1,3- and 1,4-bis(β-epithiopropyloxymethyl)benzenes, bis[4-(β-epithiopropyloxy)phenyl]methane, 2,2-bis[4-(β-epithiopropyloxy)-phenyl]propane, bis[4-(β-epithiopropyloxy)phenyl] sulfide, bis[4-(β-epithiopropyloxy)phenyl] sulfone and 4,4'-bis(β-epithiopropyloxy)biphenyl; and compounds obtained by replacing at least one hydrogen atom in the epithio group of the above compounds with methyl group.

Preferable examples of the organic compound having one or more epithioalkylthio groups of compound (C) include compounds obtained by replacing one or more epoxyalkylthio groups (specifically, β-epoxypropylthio groups) in epoxy compounds derived from a compound having mercapto group and an epihalohydrin with epithioalkylthio groups. Specific examples of the above compound include: organic compounds having a chain aliphatic backbone structure such as bis(β-epithiopropyl) sulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane and 1,11-bis(β-epithiopropylthio)-4,7-bis(β-epithiopropylthiomethyl)-3,6,9-trithiaundecane; chain compounds having an ester group and an epithioalkylthio group such as tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane and 1,1,1-tri[2-(β-epithiopropylthiomethyl)acetylmethyl]propane; compounds having an alicyclic backbone structure such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane and 2,5-bis(β-epithiopropylthioethylthiomethyl)-1,4-dithiane; compounds having an aromatic backbone structure such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone and 4,4'-bis(β-epithiopropylthio)biphenyl; and compounds obtained by replacing at least one hydrogen atom in the epithio group of the above compounds with methyl group.

Examples of compounds (A) to (C) also include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

Specific examples of the compounds having one epithio group include compounds such as ethylene sulfide, propylene sulfide and thioglycidol; thioglycidyl esters of monocarboxylic acids such as acetic acid, propionic acid and benzoic acid; and thioglycidyl ethers such as methyl thioglycidyl ether, ethyl thioglycidyl ether, propyl thioglycidyl ether and butyl thioglycidyl ether.

Among the above compounds, the organic compounds having one or more epithioalkyloxy groups described as examples of compound (B) and the organic compounds having one or more epithioalkylthio groups described as examples of compound (C) are preferable. The compounds having one or more epithioalkylthio groups described as examples of compound (C) are more preferable. Examples of still more preferable compounds include bis(β-epithiopropyl) sulfide and chain compounds, branched compounds, alicyclic compounds and aromatic compounds having two or more β-epithiopropylthio groups which are described above as the examples. A most preferable compound among the above compounds is bis(β-epithiopropyl) sulfide.

Examples of the curing catalyst used for producing an optical material in accordance with the process of the present invention include amines, phosphines, mineral acids, Lewis acids, organic acids, silicic acids and tetrafluoroboric acid.

(1) Examples of the amine used as the curing catalyst include primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2,2'-dimethylpropane, aminoethylethanolamine, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-aminomethylpiperidines, 2- and 4-aminoethylpiperidines, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalenediamines, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl) sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl) amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperidyl)methane, 1,2-di(4-piperidyl)ethane, 1,3-di(4-piperidyl)propane, 1,4-di(4-piperidyl)butane and tetramethylguanidine; tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethylethylenediamine, pyrazine, N,N'-dimethylpiperadine, N,N'-bis((2-hydroxy)propyl) piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,N-dimethylaminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl) methane, addition products of alkylimidazoles and isocyanuric acid and condensation products of alkylimidazoles and formaldehyde; and amidines such as 1,8-diazabicyclo-(5,4,0)undecene-7,1,5-diazabicyclo(4,3,0)nonene-5,6-dibutylamino-1,8-diazabicyclo(5,4,0)undecene-7.

(2) The above amines may be used as quaternary ammonium salts with halogens, mineral acids, Lewis acids, organic acids, silicic acid and tetrafluoroboric acid.

(3) The above amines may also be used as complexes with borane and boron trifluoride.

(4) Examples of the phosphine include trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl) phosphine, dimethylphenylphosphine, diethylphenylphosphine, dicyclohexylphenylphosphine, ethyldiphenylphosphine, diphenylcyclohexylphosphine and chlorodiphenylphosphine.

(5) Examples of the mineral acid include hydrochloric acid, sulfuric acid, nitric acid, phosphoric acid and carbonic acid. Half-esters of these mineral acids can also be used.

(6) Examples of the Lewis acid include boron trifluoride and boron trifluoride etherates.

(7) Organic acids and half-esters of organic acids can be used.

(8) Silicic acids and tetrafluoroboric acid can be used.

Among these compounds, primary monoamines, secondary monoamines, tertiary monoamines, tertiary polyamines, imidazoles, amidines, quaternary ammonium salts and phosphines are preferable because these compounds cause little coloring of the cured products. Secondary monoamines, tertiary monoamines, tertiary polyamines, imidazoles, amidines, quaternary ammonium salts and phosphines having one or less group which can react with the epithio group are more preferable. These compounds may be used singly or as a mixture of two or more compounds.

The above curing catalyst is used in an amount generally in the range of 0.0001 to 1.0 mol, preferably in the range of 0.0001 to 0.5 mol, more preferably in the range of 0.0001 mol or more and less than 0.1 mol and most preferably in the range of 0.0001 to 0.05 mol per 1 mol of the compound having one or more structures represented by formula (1) in one molecule. When the amount of the curing catalyst exceeds 1.0 mol, the refractivity index and heat resistance of the cured product decrease and the cured product is colored. When the amount is less than 0.0001 mol, the curing does not proceed sufficiently and heat resistance becomes insufficient.

The composition used in the present invention can provide a resin by curing by polymerization with a compound having one or more functional groups which are reactive with the epithio group in formula (1), a compound having one or more functional groups which are reactive with the epithio group in formula (1) and one or more other homopolymerizable functional groups, a compound having one or more homopolymerizable functional groups or a compound having one homopolymerizable functional group which is reactive with the epithio group in formula (1).

Examples of the compound having two or more functional groups which are reactive with the epithio group in formula (1) include epoxy compounds and polybasic carboxylic acid anhydride.

Examples of the compound having one or more functional groups which are reactive with the epithio group in formula (1) and one or more other homopolymerizable functional groups include epoxy compounds and carboxylic acid anhydrides having unsaturated groups such as methacryl group, acryl group, allyl group, vinyl group and aromatic vinyl groups.

Examples of the compound having one or more homopolymerizable functional groups include compounds having unsaturated groups such as methacryl group, acryl group, allyl group, vinyl group and aromatic vinyl groups.

Specific examples of the compound having two or more functional groups which are reactive with the epithio group are as follows. Specific examples of the epoxy compounds include the compounds described above as the examples of the epoxy compounds which provide the compounds having epithioalkyloxy groups.

Examples of the polybasic carboxylic acid anhydride include the compounds described above as the examples of the carboxylic acids anhydrides which provide the epoxy compounds by the condensation with epihalohydrins.

Specific examples of the compound having one functional group which are reactive with the epithio group in formula (1) and one or more other homopolymerizable functional groups are as follows.

Examples of the epoxy compound having unsaturated groups include vinylphenyl glycidyl ether, vinylbenzyl glycidyl ether, glycidyl methacrylate, glycidyl acrylate and allyl glycidyl ether.

Examples of the compound having one or more homopolymerizable functional groups include compounds having a structure of an ester of acrylic acid or methacrylic acid and a mono- or polyhydric alcohol such as methyl acrylate, methyl methacrylate, ethyl acrylate, ethyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diacrylate, neopentyl glycol dimethacrylate, polypropylene glycol diacrylate, polypropylene glycol dimethacrylate, 2,2-bis[4-(acryloxyethoxy)phenyl]propane, 2,2-bis[4-(methacryloxyethoxy)phenyl]propane, 2,2-bis[4-(acryloxy diethoxy)phenyl]propane, 2,2-bis[4-(methacryloxy diethoxy)phenyl]propane, 2,2-bis[4-(acryloxy.polyethoxy)phenyl]propane, 2,2-bis[4-(methacryloxy.polyethoxy)phenyl]propane, trimethylolpropane triacrylate, trimethylolpropane trimethacrylate, pentaerythritol tetraacrylate, pentaerythritol tetramethacrylate, bis(2,2,2-trimethylolethyl) ether hexaacrylate and bis(2,2,2-trimethylolethyl) ether hexamethacrylate; allyl compounds such as allyl sulfide, diallyl phthalate and diethylene glycol bisallylcarbonate; vinyl compounds such as acrolein, acrylonitrile and vinyl sulfide; and aromatic vinyl compounds such as styrene, α-methylstyrene, methylvinylbenzene, ethylvinylbenzene, a-chlorostyrene, chlorovinylbenzene, vinylbenzyl chloride, para-divinylbenzene and meta-divinylbenzene.

Preferable examples of the compound having one homopolymerizable functional group which is reactive with the epithio group include compounds having one epoxy group. Specific examples of such compound include monoepoxy compounds such as ethylene oxide, propylene oxide and glycidol; glycidyl esters of monocarboxylic acids such as acetic acid, propionic acid and benzoic acid; and glycidyl ethers such as methyl glycidyl ether, ethyl glycidyl ether, propyl glycidyl ether and butyl glycidyl ether.

In the composition used in the present invention, the compound having two or more functional groups which are reactive with the epithio group in formula (1) and the compound having one functional group described above and one or more other homopolymerizable functional groups can be produced by curing by polymerization in the presence of a curing catalyst. As the curing catalyst, the amines, the phosphines and the acids described above can be used. Examples of the curing catalyst are the same as those described above. The curing catalyst is used in the same amount as that described above.

When a compound having unsaturated groups is used, it is preferable that a radical polymerization initiator is used as the polymerization accelerator. Any compound forming a radical by heating or by irradiation of ultraviolet light or electron beams can be used as the radical polymerization initiator. Examples of the radical polymerization initiator include the following conventional polymerization catalysts used under heating: peroxides such as cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide; hydroperoxides such as cumene hydroperoxide and tert-butyl hydroperoxide; azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane); and conventional photopolymerization catalysts such as benzophenone and benzoin benzoinmethyl ether. Among these compounds, peroxides, hydroperoxides and azo compounds are preferable and peroxides and azo compounds are more preferable. Most preferable examples include azo compounds such as 2,2'-azobis(4-methoxy-2,4- dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane. The above compounds may be used as a mixture of the compounds.

The radical polymerization initiator is not the curing catalyst specified in the process of the present invention. The amount used is different depending on the components of the composition and the process for curing and cannot be decided. The amount is generally in the range of 0.01 to 5.0% by weight and preferably in the range of 0.1 to 2.0% by weight of the total amount of the composition.

In the process for producing an optical material of the present invention, it is, of course, possible that conventional additives such as antioxidants are added to improve the practical properties of the obtained materials. The optical material produced in accordance with the process of the present invention tends to be cleaved from molds during polymerization. Therefore, it is occasionally necessary that conventional external and/or internal adhesion improvers are used or added to control and improve adhesion between the cured material obtained and the mold. Examples of the internal adhesion improver include silane compounds such as 3-methacryloxypropyltrimethoxysilane, 3-glycidoxypropyltrimethoxysilane, N-(2-aminoethyl)-3-aminopropyltrimethoxysilane and 3-mercaptopropyltrimethoxysilane. The internal adhesion improver can be used in an amount of 0.0001 to 5 parts by weight per 100 parts by weight of the composition of the present invention.

It is also possible that compounds having one or more SH groups is added to the composition used in the present invention as an antioxidant component singly or in combination with conventional antioxidants to provide the cured composition with a further improved antioxidation property. Examples of the compound having one or more SH groups include mercaptans, thiophenols and mercaptans and thiophenols having unsaturated groups such as vinyl group, aromatic vinyl groups, methacryl group, acryl group and ally group.

Specific examples of the mercaptan include monomercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl (3-mercaptopropionate), ethyl (3-mercaptopropionate), 3-methoxybutyl (3-methylpropionate), n-butyl (3-mercaptpropionate), 2-ethylhexyl (3-mercaptopropionate) and n-octyl (3-mercaptopropionate); and polymercaptans such as methanedithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl) sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis(mercaptomethyl)cyclohexane, 1,3-bis-(mercaptomethyl)cyclohexane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, 1,4-bis(mercaptomethyl)benzene, 1,3-bis(mercaptomethyl)benzene, bis(4-mercaptophenyl) sulfide, bis(4-mercaptophenyl) ether, 2,2-bis(4-mercaptophenyl)propane, bis(4-mercaptomethylphenyl) sulfide, bis(4-mercaptomethylphenyl) ether, 2,2-bis(4-mercaptomethylphenyl)propane, 2,5-dimercapto-1,3,4-thiadiazole and 3, 4-thiophenedithiol.

Specific examples of the thiophenol include thiophenol, 4-tert-butylthiophenol, 2-methylthiophenol, 3-methylthiophenol, 4-methylthiophenol, 1,2-dimercaptobenzene, 1,3-dimercaptobenzene and 1,4-dimercaptobenzene.

Specific examples of the mercaptans and thiophenols having unsaturated groups are as follows.

Specific examples of the mercaptan having unsaturated groups include allyl mercaptan, 2-vinylbenzyl mercaptan, 3-vinylbenzyl mercaptan and 4-vinylbenzyl mercaptan.

Specific examples of the thiophenol having unsaturated groups include 2-vinylthiophenol, 3-vinylthiophenol and 4-vinylthiophenol. The above compounds may be used singly or as a combination of two or more types. The above compounds can be used in an amount of 0.001 to 40 parts by weight per 100 parts by weight of the composition used in the present invention.

It is also possible that a compound having one or more active hydrogen atoms other than that of SH group is used to improve the properties such as the tint performance and strength. Examples of the active hydrogen atom include hydrogen atoms in hydroxyl group, carboxyl group and amide group and hydrogen atoms at the 2-position of 1,3-diketones, 1,3-dicarboxylic acids, esters of 1,3-dicarboxylic acids, 3-ketocarboxylic acids and esters of 3-ketocarboxylic acids. Examples of the compound having one or more active hydrogen atoms in one molecule include alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids, and compounds having unsaturated groups such as alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids and esters of 3-ketocarboxylic acids having vinyl group, aromatic vinyl groups, methacryl group, acryl group and allyl group.

Examples of the alcohol include monohydric alcohols such as methanol, ethanol, n-propyl alcohol, isopropyl alcohol, n-butyl alcohol, isobutyl alcohol, sec-butyl alcohol, tert-butyl alcohol, n-pentyl alcohol, isopentyl alcohol, n-hexyl alcohol, n-heptyl alcohol, n-octyl alcohol, n-nonyl alcohol, n-decyl alcohol, n-dodecyl alcohol, cyclopentanol, cyclohexanol, 2-methylthioethanol, 2-ethylthioethanol, 2-(n-dodecylthio)ethanol and n-dodecyl hydroxyethyl sulfoxide; and polyhydric alcohols such as ethylene glycol, propylene glycol, 1,3-propanediol, diethylene glycol, triethylene glycol, polyethylene glycol, 1,3-butylene glycol, 1,6-hexanediol, neopentyl glycol, polypropylene glycol, glycerol, pentaerythritol monomethacrylate, pentaerythritol monoacrylate, pentaerythritol dimethacrylate, pentaerythritol diacrylate, 2,5-dimethyl-3-hexyne-2,5-diol, 2,5-dimethylhexane-2,5-diol, trimethylolpropane, pentaerythritol, hydrogenated bisphenol A, 2-hydroxyethyl isocyanurate and 2-hydroxyethyl cyanurate.

Examples of the phenol include phenol, o-cresol, m-cresol, p-cresol, catechol, resorcinol, hydroquinone, o-hydroxybenzaldehyde, m-hydroxybenzaldehyde, p-hydroxybenzaldehyde, bisphenol A, bisphenol F and bisphenol Z.

Examples of the mercaptoalcohol include 2-mercaptoethanol, 3-mercaptopropanol, 2-mercaptopropanol, 2-hydroxypropylmercaptan, 2-phenyl-2-mercaptoethanol, 2-phenyl-2-hydroxyethylmercaptan, 3-mercapto-1, 2-propanediol, 2-mercapto-1,3-propanediol, 2, 3-dimercaptopropanol, 1,3-dimercapto-2-propanol, 2,2-dimethylpropane-1,3-dithiol and glyceryl dithioglycolate.

Examples of the hydroxythiophenol include 2-hydroxythiophenol, 3-hydroxythiophenol and 4-hydroxythiophenol.

Examples of the carboxylic acid include formic acid, acetic acid, propionic acid, butyric acid, valeric acid, caproic acid, caprylic acid, methyl mercaptopropionate, oxalic acid, malonic acid, succinic acid, glutaric acid, adipic acid, cyclohexanecarboxylic acid, benzoic acid, o-toluic acid, m-toluic acid, p-toluic acid, 2-methoxybenzoic acid, 3-methoxybenzoic acid, phthalic acid, isophthalic acid, terephthalic acid, thiodipropionic acid and dithiodipropionic acid.

Examples of the mercaptocarboxylic acid include thioglycolic acid, 2-thiopropionic acid, 3-thiopropionic acid, thiolactic acid, mercaptosuccinic acid, thiomalic acid, N-(2-mercaptopropionyl)glycine, 2-mercaptobenzoic acid, 2-mercaptonicotinic acid, 3,3-dithioisobutyric acid, dithioglycolic acid, and dithiopropionic acid.

Examples of the hydroxycarboxylic acid include hydroxyacetic acid, α-hydroxypropionic acid, β-hydroxypropionic acid, α-hydroxybutyric acid, β-hydroxybutyric acid, γ-hydroxybutyric acid, salicylic acid, 3-hydroxybenzoic acid and 4-hydroxybenzoic acid.

Examples of the amide include formamide, N-methylformamide, acetamide, N-methylacetamide, phthalamide, isophthalamide, terephthalamide, benzamide, toluamide, 4-hydroxybenzamide and 3-hydroxybenzamide.

Examples of the 1,3-diketone include acetylacetone and cyclohexane-1,3,5-trione.

Examples of the 1,3-dicarboxylic acid and the ester thereof include malonic acid, 2-methylmalonic acid and mono- and diesters thereof.

Examples of the 3-ketocarboxylic acid and the ester thereof include acetoacetic acid and esters thereof.

Specific examples of the alcohol, phenol, mercaptan, thiophenol, mercaptoalcohol, carboxylic acid and amide having unsaturated groups are as follows.

Examples of the alcohol having unsaturated groups include monohydroxy compounds such as 2-hydroxyethyl methacrylate, 2-hydroxyethyl acrylate, 3-hydroxypropyl methacrylate, 3-hydroxypropyl acrylate, 2-hydroxypropyl methacrylate, 2-hydroxypropyl acrylate, 1,3-dimethacryloxy-2-propanol, 1,3-diacryloxy-2-propanol, 1-acryloxy-3-methacryloxy-2-propanol, pentaerythritol trimethacrylate, pentaerythritol triacrylate, bis(2,2,2-trimethylolethyl) ether pentamethacrylate, bis(2,2,2-trimethylolethyl) ether pentaacrylate, trimethylolpropane dimethacrylate, trimethylolpropane diacrylate, allyl alcohol, crotyl alcohol, methyl vinyl carbinol, cinnamyl alcohol, 4-vinylbenzyl alcohol, 3-vinylbenzyl alcohol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, 3-phenoxy-2-hydroxypropyl acrylate, 2-hydroxyethyl isocyanurate bis(acrylate), 2-hydroxyethyl isocyanurate bis(methacrylate), 2-hydroxyethyl cyanurate bis(acrylate), 2-hydroxyethyl cyanurate bis(methacrylate), 3-methyl-1-butyn-3-ol, 3-methyl-1-pentyn-3-ol and propargyl alcohol; polyhydroxy compounds such as pentaerythritol dimethacrylate, pentaerythritol diacrylate, pentaerythritol monomethacrylate, pentaerythritol monoacrylate, trimethylolpropane monomethacrylate, trimethylolpropane monoacrylate, 2-hydroxyethyl isocyanurate mono(acrylate), 2-hydroxyethyl isocyanurate mono(methacrylate), 2-hydroxyethyl cyanurate mono(acrylate) and 2-hydroxyethyl cyanurate mono(methacrylate); and unsaturated polyhydroxy compounds formed by the addition reaction of acrylic acid or methacrylic acid such as 2,2-bis [4-(2-hydroxy-3-methacryloxypropoxy)phenyl]propane.

Examples of the phenol having unsaturated groups include 2-vinylphenol, 3-vinylphenol and 4-vinylphenol.

Examples of the mercaptoalcohol having unsaturated groups include 2-(4-vinylbenzylthio)-2-mercaptoethanol and 2-(3-vinylbenzylthio)-2-mercaptoethanol.

Examples of the carboxylic acid having unsaturated groups include acrylic acid, methacrylic acid, crotonic acid, monohydroxyethyl acrylate phthalate, maleic acid, fumaric acid, monoallyl phthalate and cinnamic acid.

Examples of the amide having unsaturated groups include amides of α,β-unsaturated carboxylic acids such as acrylic acid, methacrylic acid, maleic acid, maleic anhydride and fumaric acid; and N-vinylformamide.

From the standpoint of heat resistance, preferable examples of the above compounds include mercaptoalcohols, hydroxythiophenols and alcohols having unsaturated groups.

The above compounds may be used singly or as a mixture of two or more compounds. The above compounds can be used in an amount of 0.01 to 40 parts by weight per 100 parts by weight of the composition used in the present invention.

In the process for producing a tinted optical material of the present invention, the compound having one or more structures represented by formula (1) in one molecule is used as the raw material and a catalyst is used in combination. The above antioxidants, adhesion improvers, other additives such as antioxidants other than the above antioxidants and various agent to improve properties may also be used, where desired, in an amount of 0.001 to 80% by weight, preferably 0.01% to 50% by weight and more preferably 0.01 to 30% by weight based on the total amount of the above compounds and the curing catalyst. These components are mixed together and the prepared mixture is cured by polymerization to produce optical materials such as lenses. The mixture is cast into a mold made of glass or a metal and cured by heating. The cured product is then taken out of the mold.

It is possible that, before being cast into a mold, a preliminary polymerization of the compound having one or more structures represented by formula (1) alone or a composition comprising the compound is conducted at −100 to 160° C. for 0.1 to 72 hours in the presence or the absence of a catalyst while being stirred or not stirred and then the prepared intermediate composition is cast into a mold. The preliminary polymerization can be conducted preferably at −10 to 100° C. for 1 to 48 hours and more preferably at 0 to 60° C. for 1 to 48 hours. The curing time is 0.1 to 100 hours and generally 1 to 48 hours. The curing temperature is −10 to 160° C. and generally −10 to 140° C. The polymerization can be conducted by the steps of holding the temperature at a specific polymerization temperature for a specific period of time, increasing the temperature at a speed of 0.1 to 100° C./hour and decreasing the temperature at a speed of 0.1 to 100° C./hour or a combination of these steps. To remove strains from the prepared optical material of the present invention, it is preferable that the material obtained after the curing is annealed at a temperature of 50 to 150° C. for about 10 minutes to 5 hours. Where necessary, the prepared material may receive treatments of tinting, formation of hard coat, prevention of reflection and prevention of clouding.

The process for producing the optical material of the cured resin of the present invention is described more specifically in the following. The main material and auxiliary materials are mixed together as described above and the obtained mixture is cast into a mold and cured. The compound having one or more structures represented by formula (1) alone or a composition comprising the compound, the catalyst and components which are optionally used, i.e., the compound having two or more functional groups reactive with the epithio group, the compound having one or more functional groups reactive with the epithio group and one or more homopolymerizable functional groups, the compound having one or more homopolymerizable groups, or the compound having one homopolymerizable functional group which is reactive with the epithio group and other optional components such as antioxidants, radical polymerization initiators, adhesion improvers and stabilizers, may be mixed together in one vessel at the same time in the entire amounts. Alternatively, the components may be added stepwise. Some components may also be mixed together separately in advance and the obtained mixtures may be mixed with other components in one vessel. The main materials and the auxiliary materials may be mixed together in any desired order. In general, the temperature of mixing and the time of mixing are not limited as long as the components can be sufficiently mixed together. However, an excessively high temperature and an excessively long time are not preferable because undesirable reactions take place between the components to increase viscosity and the operation of casting becomes difficult. The temperature of mixing should be in the range of about −50 to 100° C., preferably in the range of −30 to 50° C. and more preferably in the range of −5 to 30° C. The time of mixing is in the range of 1 minute to 5 hours, preferably in the range of 5 minutes to 2 hours, more preferably in the range of 5 to 30 minutes and most preferably in the range of about 5 to 15 minutes. It is preferable that degassing under a vacuum is conducted before, during or after mixing the materials and the additives to prevent formation of bubbles during casting and curing in the mold. The pressure of the degassing is 0.1 to 700 mmHg and preferably is 10 to 300 mmHg. To obtain a better quality of the optical material of the present invention, it is preferable that impurities are removed before the casting from the main material and the auxiliary materials by filtration using a filter having a pore diameter of 0.1 to 3 microns.

In the present invention, tinting of the optical material which has been cured by polymerization is generally conducted after the material is dipped into a liquid containing 0.01% or more of a polar inorganic compound and/or a polar organic compound at a temperature of −50° C. or higher and 200° C. or lower. This dipping treatment is a pretreatment for tinting and the above liquid is a pretreatment liquid for tinting. When the pretreatment is conducted, a material which is not easily tinted can be tinted easily in a short time. The dipping temperature is preferably −20 to 200° C. and more preferably 0 to 150° C. When the dipping temperature is lower than the above range, the effect of the pretreatment is insufficient. When the dipping temperature is higher than the above range, the material is deformed. Therefore, dipping temperatures outside the above range are not preferable. The pretreatment liquid for tinting contains a polar inorganic compound and/or a polar organic compound in an amount of 0.1% or more, preferably 1% or more, more preferably 5% or more, still more preferably 10% or more and most preferably 30% or more. The pretreatment liquid for tinting is not particularly limited as long as the liquid satisfies the above condition. Specifically, the pretreatment liquid is a liquid prepared by dissolving or dispersing 0.1% or more of a polar inorganic compound and/or a polar organic compound in water, an organic solvent or a mixture of water and an organic solvent. The pretreatment liquid may be a polar inorganic compound and/or a polar organic compound alone.

Examples of the polar inorganic compound include (1) inorganic acids, (2) salts of inorganic acids and ammonia, alkali metals and alkaline earth metals and (3) basic substances such as hydroxides, sulfides and carbonates.

Specific examples of (1) inorganic acids include mineral acids which are described as the examples of the catalyst, nitric acid, hydrochloric acid, perchloric acid, hypochlorous acid, chlorine dioxide, hydrofluoric acid, sulfuric acid, fuming sulfuric acid, boric acid, arsenic acid, arsenious acid, pyroarsenic acid, phosphoric acid, phosphorous acid, hypophosphoric acid, phosphorus oxychloride, phosphorus oxybromide, phosphorus trichloride, phosphorus tribromide, phosphorus pentachloride, cyanic acid, chromic acid, nitric anhydride, sulfuric anhydride, boron oxide, arsenic pentaoxide, phosphorus pentaoxide, chromic anhydride, sulfuryl chloride, silica gel, silica-alumina, silicic acids and tetrafluoroboric acid.

Specific examples of (2) salts of inorganic acids and ammonia, alkali metals and alkaline earth metals include sodium nitrate, magnesium sulfate and ammonium sulfate.

Specific examples of (3) basic substances such as hydroxides, sulfides and carbonates include phosphorus sulfide, sodium hydroxide and calcium carbonate.

The above compounds can be used singly or as a combination of two or more compounds.

Examples of the polar organic compounds include compounds which are described as the examples of the curing catalyst, i.e., amines, phosphines, Lewis acids, mineral acids, silicic acids and tetrafluoroboric acids, and organic acids. Specific examples of the organic acid include carboxylic acids such as formic acid, acetic acid, propionic acid, butyric acid, valeric acid, caproic acid, capric acid, naphthenic acid, methyl mercaptopropionate, oxalic acid, malonic acid, succinic acid, glutaric acid, adipic acid, maleic acid, cyclohexanecarboxylic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, benzylic acid, α-naphthalenecarboxylic acid, β-naphthalenecarboxylic acid, thiodipropionic acid, dithiodipropionic acid acetic acid, peracetic acid, thioacetic acid, tartaric acid, maleic anhydride, benzoic anhydride, phthalic anhydride, trimellitic anhydride and pyromellitic anhydride; organophosphorus compounds such as phosphoric acids examples of which include mono-, di- and trimethyl phosphates, mono-, di- and triethyl phosphates, mono-, di- and triisobutyl phosphates, mono-, di- and tributyl phosphates and mono-, di- and trilauryl phosphates, phosphites corresponding to the above phosphates and dialkyl dithiophosphates examples of which include methyl dithiophosphate; phenols such as phenol, catechol, t-butylcatechol, 2,6-di-t-butylcresol, 2,6-di-t-butylethylphenol, resorcinol, hydroquinone, phloroglucinol, pyrogallol, cresol, ethylphenol, butylphenol, nonylphenol, hydroxyphenylacetic acid, hydroxyphenylpropionic acid, hydroxyphenylacetamide, methyl hydroxyphenylacetate, hydrophenetyl alcohol, hydroxyphenetylamine, hydroxybenzaldehyde, phenylphenol, bisphenol A, 2,2,'-methylene-bis(4-methyl-6-t-butylphenol), bisphenol F, bisphenol S, α-naphthol, β-naphthol, aminophenol, chlorophenol and 2,4,6-trichlorophenol; sulfonic acids such as methanesulfonic acid, ethanesulfonic acid, butanesulfonic acid, dodecanesulfonic acid, benzenesulfonic acid, o-toluenesulfonic acid, m-toluenesulfonic acid, p-toluenesulfonic acid, ethylbenzenesulfonic acid, butylbenzenesulfonic acid, dodecylbenzenesulfonic acid, p-phenolsulfonic acid, o-cresolsulfonic acid, metanylic acid, sulfanilic acid, 4B-acid, diaminostilbenesulfonic acid, biphenylsulfonic acid, α-naphthalenesulfonic acid, β-naphthalenesulfonic acid, peri acid, Laurent's acid and phenyl J-acid; and mercaptans which are described as the examples of the compounds having one or more SH groups used as the antioxidant.

Further examples of the polar organic compound include aromatic compounds not described above such as benzene, biphenyl, naphthalene, anthracene, phenanthrene, alkylbenzenes, styrene, α-alkylnaphthalenes, β-alkylnaphthalenes, α-vinylnaphthalene, β-vinylnaphthalene, phenyl ethers, esters of benzoic acid, ester of salicylic acid, mono- and diesters of phthalic acid, mono- and diesters of isophthalic acid, mono- and diesters of terephthalic acid, benzenesulfinic acid and toluenesulfinic acid. The above compounds may also be used as a combination of two or more compounds.

Among the above compounds, inorganic acids and organic acids are preferable and inorganic compounds having a sulfate group, organic compounds having a sulfate group and mono- and dihydric phenols are more preferable. Organic compounds having a sulfonic group, salts thereof, sulfuric acid, salts thereof and mono- and dihydric phenols are most preferable. The other component constituting the pretreatment liquid for tinting is a liquid, which is water, an organic solvent or a mixture of water and an organic solvent and preferably water or a mixture of water and an organic solvent. Examples of the organic solvent include methanol, ethanol, butanol, benzyl alcohol, phenetyl alcohol, ethylene glycol, diethylene glycol, triethylene glycol, glycerol, xylylenediol, methylcellosolve, ethylcellosolve, acetic acid, ethyl acetate, butyl acetate, tetrahydrofuran, methyltetrahydrofuran, acetone, butanone, DMF, DMSO, 2-hydroxyethylamine, 2,2'-iminodiethanol and 2-mercaptoethanol.

The pretreatment for tinting is conducted by dipping the resin optical material such as a lens obtained by curing by polymerization into a pretreatment liquid. The dipping time is not particularly limited as long as the desired effect is substantially exhibited. The dipping temperature is not particularly limited either as long as the desired effect on tinting is substantially exhibited. It is preferable that the dipping temperature is −50 to 200° C. To increase the effect of the pretreatment and to achieve excellent uniform tinting, it is preferable that the resin optical material is washed with water, an aqueous alkali solution, an aqueous acid solution or an organic solvent before or after the dipping, where necessary.

The process for tinting is not particularly limited and can be selected from conventional processes. For example, a process described in Japanese Patent Application Laid-Open No. Heisei 4(1992)-93310 may be conducted. The tinting is conducted in a tinting bath at a temperature in the range of about room temperature to about 200° C. Occasionally, the desired temperature cannot be achieved in an ordinary heating due to the property of the components of the tinting bath. In this case, the desired tinting temperature can be achieved under pressure or by addition of a component which enables an increase in the boiling point, i.e., by the method of boiling point elevation.

When the boiling point is increased under pressure, a pressure tank or an autoclave is used and the tinting is generally conducted under a pressure of 1.1 to 20 atm.

As the component which enables an increase in the boiling point, inorganic salts and organic compounds soluble in water which exhibit the effect of molar boiling point elevation are added when water is used as the component of the bath. The inorganic salt is not particularly limited as long as the salt is a conventional inorganic compound soluble in water such as potassium chloride and potassium iodide. The organic compound is not particularly limited either as long as the compound is a conventional organic compound soluble in water such as urea and sodium acetate.

A liquid composition containing 0.01 to 100 g of dyestuffs and, optionally, 0.001 to 50 g of surfactants and 0.001 to 50 g of a carrier compound per one liter of water is heated at 200° C. and the tinting is conducted by dipping the material in the liquid composition. The amount of the dyestuffs used in the liquid composition is 0.001 to 100 g, preferably 0.05 to 50 g and more preferably 0.1 to 25 g per one liter of water. When the amount of the dyestuffs is less than 0.01 g, the time required for tinting increases and sufficient tinting cannot be achieved. When the amount of the dyestuffs exceeds 100 g, the dyestuffs are agglomerated together and uniform dispersion of the dyestuffs becomes difficult. This adversely affects the tinting and uneven tinting occurs. As the dyestuffs, commercial dyestuffs which are conventionally used in the field of the present invention such as disperse dyes, reactive dyes, cation dyes, basic dyes, acidic dyes, sulfide dyes and in-grain dyes can be used. However, any other dyestuffs may be used as long as the desired effects can be exhibited. Examples of such dyestuffs include disperse dyes such as DIANIX-YELLOW, -ORANGE, -SCARLET, -RED, -PINK, -VIOLET, -BLUE, -GRAY and -BLACK; reactive dyes such as REMAZOL-YELLOW, -RED, -BLUE, -GRAY and -BLACK; and cation dyes such as ASTRAZON-YELLOW, -RED, -VIOLET, -BLUE, -GREEN and -BLACK (all trade names, manufactured by DYESTAR JAPAN Co., Ltd.). The above dyestuffs may be used as a mixture of several types in accordance with the application.

A carrier compound is occasionally not required. When a carrier compound is necessary, the amount used is 0.001 to 50 g and preferably 0.005 to 50 g per one liter of water. When the amount of the carrier compound is less than 0.001 g, the effect of the carrier compound is not sufficiently exhibited. When the amount exceeds 50 g, uniform tinting becomes difficult. As the carrier compound, aromatic compounds and aromatic ester compounds are typically used. However, the carrier compound is not particularly limited as long as the effect similar to that of these compounds is exhibited. Examples of the carrier compound include compounds described in "Senshoku Kako Kogaku Gairon (Introduction to Tinting Engineering)" (published by SEN' I KENKYUSHO Co., Ltd.), pages 205 to 286, which are aromatic compounds having a phenolic hydroxyl group such as phenol, cresol, naphthol, resorcinol, catechol, bisphenol A, pyrogallol and phloroglucinol; alcohols, such as methanol, ethanol, benzyl alcohol, phenetyl alcohol, ethylene glycol, glycerol and xylylenediol; benzoic acid; salicylic acid; diphenylphenol; ortho-phenylphenol; paraphenylphenol; naphthalene; esters such as esters of benzoic acid, esters of salicylic acid, mono- and diesters of phthalic acid, mono- and diesters of isophthalic acid and mono- and diesters of terephthalic acid; alkylbenzenes; monochlorobenzene; dichlorobenzene; trichlorobenzene; styrene; α-alkylnaphthalenes; β-alkylnaphthalenes; α-vinylnaphthalene; and β-vinylnaphthalene.

The above compounds may be used as a mixture of suitable compounds, where necessary.

To summarize the advantages obtained by the present invention, a resin obtained by curing by polymerization of a compound having one or more structures represented by formula (1) alone or a composition comprising the compound can be tinted in accordance with the process for tinting of the present invention comprising the pretreatment for tinting, although the resin is hardly tinted in accordance with conventional process for tinting, and an optical material having an excellent balance between a high refractive index and a high Abbe number is successfully obtained.

EXAMPLES

The present invention is described more specifically with reference to the following examples. However, the present invention is not limited to the examples. The evaluation of the obtained polymers and the evaluation of the process for tinting and the tinted products were conducted in accordance with the following methods.

Tint performance: A sample was dipped into a tinting bath having the following composition at a temperature of 90° C. for 30 minutes:

SEIKO PRAX DIACOAT BROWN D 0.2% by weight

SEIKO PRAX tinting auxiliary agent 0.3% by weight benzyl alcohol 2.0% by weight

The tint performance was obtained in accordance with the following equation:

Tint performance=100−total light transmittance (%)

Refractivity index (nD) and Abbe number (vD): The refractivity index and the Abbe number were measured at 25° C. using an Abbe refractometer.

Examples 1

To 100 parts by weight of bis(β-epithiopropyl) sulfide, 0.5 parts by weight of 2-diethylaminoethanol as the catalyst was mixed and the obtained mixture was stirred at room temperature to obtain a homogeneous solution. The obtained composition was cast into a flat mold for a lens having a thickness of 2.5 mm and cured by polymerization under heating while the temperature was raised from 10° C. to 120° C. during 22 hours in an oven to prepare a lens. The prepared lens showed excellent heat resistance and oxidation resistance. The lens not only had excellent optical properties and physical properties but also showed an excellent surface condition with little striae or surface deformation. The obtained lens was pretreated for tinting by dipping into a concentrated sulfuric acid (98%) at 20° C. for 30 minutes and then tinted. The tinted lens did not have uneven tinting and showed an excellent surface condition. No deformation of the surface was found. The optical properties and the tint performance of the prepared lens are shown in Table 1.

Examples 2 to 4

The same procedures as those conducted in Example 1 were conducted except that the pretreatment for tinting was not conducted by dipping into the concentrated sulfuric acid at 20° C. for 30 minutes but was conducted by dipping in the conditions shown in Table 1. The results are shown in Table 1.

Examples 5 to 11

The same procedures as those conducted in Example 1 were conducted except that lenses were prepared from compositions shown in Table 1 in place of 100 parts by weight of bis(β-epithiopropyl) sulfide and the pretreatment for tinting was conducted in the conditions shown in Table 1. The results are shown in Table 1.

Examples 12 to 18

The same procedures as those conducted in Example 1 were conducted except that lenses were prepared from compositions shown in Table 2 in place of 100 parts by weight of bis(β-epithiopropyl) sulfide and the pretreatment for tinting was conducted in the conditions shown in Table 2. The results are shown in Table 2.

Comparative Example 1

The same procedures as those conducted in Example 1 were conducted except that the pretreatment for tinting was not conducted. The results are shown in Table 3.

Comparative Example 2

The same procedures as those conducted in Example 5 were conducted except that the pretreatment for tinting was not conducted. The results are shown in Table 3.

Comparative Example 3

The same procedures as those conducted in Example 14 were conducted except that the pretreatment for tinting was not conducted. The results are shown in Table 3.

Comparative Example 4

The same procedures as those conducted in Example 1 were conducted except that the pretreatment for tinting was not conducted by dipping into a concentrated sulfuric acid at 20° C. for 30 minutes but was conducted by dipping into liquid paraffin at 120° C. for 60 minutes. The results are shown in Table 3.

TABLE 1

| | composition (parts by weight) | $n_D/v_D$ | pretreatment for tinting compound | temperature (° C.) | time (min) | tint performance (%) |
|---|---|---|---|---|---|---|
| Example 1 | bis(β-epithiopropyl) sulfide | 1.71/36 | 98% $H_2SO_4$ | 20 | 30 | 67 |
| Example 2 | bis(β-epithiopropyl) sulfide | 1.71/36 | 98% $H_2SO_4$ | 40 | 30 | 61 |
| Example 3 | bis(β-epithiopropyl) sulfide | 1.71/36 | catechol 100% | 100 | 120 | 55 |
| Example 4 | bis(β-epithiopropyl) sulfide | 1.71/36 | toluenesulfonic acid, 90% | 120 | 30 | 65 |
| Example 5 | bis(β-epithiopropyl) sulfide/ n-butyl thioglycolate = 95/5 | 1.70/36 | 98% $H_2SO_4$ | 20 | 30 | 77 |
| Example 6 | bis(β-epithiopropyl) sulfide/ 2-mercaptoethanol = 95/5 | 1.70/36 | 98% $H_2SO_4$ | 20 | 30 | 85 |
| Example 7 | bis(β-epithiopropyl) sulfide/ bis(2-mercaptoethyl) sulfide = 95/5 | 1.70/36 | 98% $H_2SO_4$ | 20 | 30 | 69 |
| Example 8 | bis(β-epithiopropyl) sulfide/ n-butyl thioglycolate/ 2-mercaptoethanol = 94.5/2.5/3 | 1.70/36 | 98% $H_2SO_4$ | 20 | 30 | 83 |
| Example 9 | bis(β-epithiopropyl) sulfide/ n-butyl thioglycolate/ 2-mercaptoethanol = 94.5/2.5/3 | 1.70/36 | toluenesulfonic acid, 90% | 120 | 15 | 85 |
| Example 10 | bis(β-epithiopropyl) sulfide/ n-butyl thioglycolate/ 2-hydroxyethyl methacrylate = 93/6/1 | 1.70/36 | 98% $H_2SO_4$ | 20 | 30 | 84 |
| Example 11 | bis(β-epithiopropyl) sulfide/ n-butyl thioglycolate/ 2-hydroxyethyl methacrylate = 93/6/1 | 1.70/36 | benzenesulfonic acid, 91% | 100 | 30 | 90 |

TABLE 2

| | composition (parts by weight) | $n_D/v_D$ | pretreatment for tinting compound | temperature (° C.) | time (min) | tint performance (%) |
|---|---|---|---|---|---|---|
| Example 12 | bis(β-epithiopropyl) sulfide/ bis(2-mercaptoethyl) sulfide/ hydroxyethyl methacrylate = 90/5/5 | 1.70/36 | 98% $H_2SO_4$ | 20 | 30 | 84 |
| Example 13 | bis(β-epithiopropyl) sulfide/ bis(2-mercaptoethyl) sulfide/ hydroxyethyl methacrylate = 90/5/5 | 1.70/36 | dodecylbenzenesulfonic acid, 90% | 100 | 30 | 71 |
| Example 14 | bis(β-epithiopropyl) sulfide/ bis(2-mercaptoethyl) sulfide/ 2-phenoxy-3-hydroxypropyl acrylate = 90/5/5 | 1.70/36 | 98% $H_2SO_4$ | 20 | 30 | 82 |
| Example 15 | bis(β-epithiopropyl) sulfide/ bis(2-mercaptoethyl) sulfide/ 2-phenoxy-3-hydroxypropyl acrylate = 90/5/5 | 1.70/36 | toluenesulfonic acid, 90% | 120 | 30 | 90 |
| Example 16 | bis(β-epithiopropyl) sulfide/ bis(2-mercaptoethyl) sulfide/ 2-phenoxy-3-hydroxypropyl acrylate = 90/5/5 | 1.70/36 | toluenesulfonic acid, 90% | 120 | 3 | 79 |
| Example 17 | bis(β-epithiopropyl) sulfide/ bis(2-mercaptoethyl) sulfide/ glycidol = 92/5/3 | 1.70/36 | 98% $H_2SO_4$ | 20 | 30 | 88 |
| Example 18 | bis(β-epithiopropyl) sulfide/ bis(2-mercaptoethyl) sulfide/ glycidol = 92/5/3 | 1.70/36 | catechol 100% | 100 | 120 | 69 |

TABLE 3

| | composition (parts by weight) | $n_D/v_D$ | pretreatment for tinting compound | temperature (° C.) | time (min) | tint performance (%) |
|---|---|---|---|---|---|---|
| Comparative Example 1 | bis(β-epithiopropyl) sulfide | 1.71/36 | — | — | — | 15 |
| Comparative Example 2 | bis(β-epithiopropyl) sulfide/ n-butyl thioglycolate = 95/5 | 1.70/36 | — | — | — | 17 |

TABLE 3-continued

| | composition (parts by weight) | $n_D/v_D$ | pretreatment for tinting compound | temperature (° C.) | time (min) | tint performance (%) |
|---|---|---|---|---|---|---|
| Comparative Example 3 | bis(β-epithiopropyl) sulfide/ bis(2-mercaptoethyl) sulfide/ 2-phenoxy-3-hydroxypropyl acrylate = 90/5/5 | 1.70/36 | — | — | — | 40 |
| Comparative Example 4 | bis(β-epithiopropyl) sulfide | 1.71/36 | liquid paraffin | 120 | 60 | 15 |

What is claimed is:

1. A process for tinting a resin comprising dipping a resin into a liquid containing at least one polar compound selected from the group consisting of polar inorganic compounds and polar organic compounds and subsequently tinting the resin, wherein the resin is obtained by curing by polymerization of a sulfur-containing compound alone or a composition comprising the sulfur-containing compound, the sulfur-containing compound having in the molecule thereof one or more structures represented by the following formula (1):

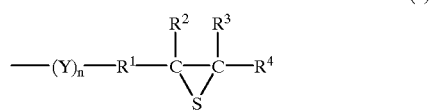

(1)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, Y represents S or O and n represents 0 or 1.

2. A process for tinting a resin comprising dipping a resin into a liquid containing at least one polar compound selected from the group consisting of polar inorganic compounds and polar organic compounds and subsequently tinting the resin, wherein the resin is obtained by curing by polymerization of a sulfur-containing compound alone or a composition comprising the sulfur-containing compound, the sulfur-containing compound having in the molecule thereof one or more structures represented by the following formula (2):

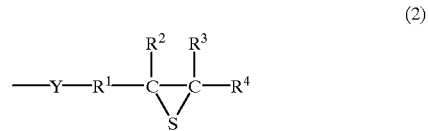

(2)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms and Y represents S or O.

3. A process for tinting a resin comprising dipping a resin into a liquid containing at least one polar compound selected from the group consisting of polar inorganic compounds and polar organic compounds and subsequently tinting the resin, wherein the resin is obtained by curing by polymerization of a sulfur-containing compound alone or a composition comprising the sulfur-containing compound, the sulfur-containing compound having in the molecule thereof one or more structures represented by the following formula (3):

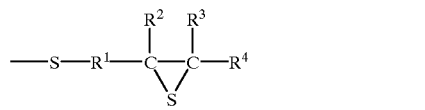

(3)

wherein $R^1$ represents a hydrocarbon group having 1 to 10 carbon atoms and $R^2$, $R^3$ and $R^4$ each represents a hydrogen atom or a hydrocarbon group having 1 to 10 carbon atoms.

4. A process for tinting a resin comprising dipping a resin into a liquid containing at least one polar compound selected from the group consisting of polar inorganic compounds and polar organic compounds and subsequently tinting the resin, wherein the resin is obtained by curing by polymerization of a sulfur-containing compound alone or a composition comprising the sulfur-containing compound, the compound being represented by the following formula (4):

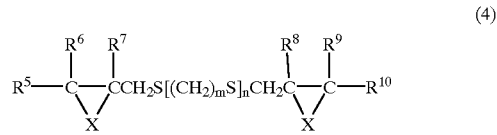

(4)

wherein $R^5$ to $R^{10}$ each represents a hydrogen atom or a hydrocarbon group having 1 to 10 carbon atoms, X represents S or O, an average number of S represented by X is 50% or more of a total number of S and O constituting the three-membered rings, m represents 1 to 6 and n represents 0 to 4.

5. A process according to claim 1, wherein the at least one polar compound is selected from the group consisting of (i) a polar inorganic compound comprising sulfuric acid or a salt thereof and (ii) a polar organic compound selected from the group consisting of an organic compound having a sulfonic group, a salt of an organic compound having a sulfonic group, a monohydric phenol and a dihydric phenol.

6. A process according to claim 1, wherein the liquid is an aqueous solution containing at least 0.1% by weight of the polar compound selected from the group consisting of the polar inorganic compounds and the polar organic compounds, and the dipping is carried out at a temperature of −20 to 200° C.

7. A process according to claim 1, wherein the liquid contains 50% by weight or more of the polar compound selected from the group consisting of the polar inorganic compounds and the polar organic compounds.

8. A process according to claim 1, wherein the composition further comprises a compound having at least one SH group.

9. A tinted optical material produced in accordance with the process described in claim 1.

10. A process according to claim 2, wherein the at least one polar compound is selected from the group consisting of (i) a polar inorganic compound comprising sulfuric acid or a salt thereof and (ii) a polar organic compound selected from the group consisting of an organic compound having a sulfonic group, a salt of an organic compound having a sulfonic group, a monohydric phenol and a dihydric phenol.

11. A process according to claim 2, wherein the liquid is an aqueous solution containing at least 0.1% by weight of the polar compound selected from the group consisting of the polar inorganic compounds and the polar organic compounds, and the dipping is carried out at a temperature of −20 to 200° C.

12. A process according to claim 2, wherein the liquid contains 50% by weight or more of the polar compound selected from the group consisting of the polar inorganic compounds and the polar organic compounds.

13. A process according to claim 2, wherein the composition further comprises a compound having at least one SH group.

14. A tinted optical material produced in accordance with the process described in claim 2.

15. A process according to claim 1, wherein $R^1$ is a methylene group or an ethylene group and $R^2$, $R^3$ and $R^4$ each is a hydrogen atom or a methyl group.

16. A process according to claim 1, wherein $R^1$ is a methylene group and $R^2$, $R^3$ and $R^4$ each is a hydrogen atom.

17. A process according to claim 1, wherein the sulfur-containing compound is selected from the group consisting of 1,1-bis(epithioethyl)methane, 1-(epithioethyl)-1-(β-epithiopropyl)methane, 1,1-bis(β-epithiopropyl)methane, 1-(epithioethyl)-1-(β-epithio-propyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, 1,1,1-tris(β-epithiopropyl)propane, 1,3-bis(β-epithiopropyl)-1-(β-epithiopropyl)-2-thiapropane, 1,5-bis (β-epithiopropyl)-2,4-bis(β-epithiopropyl)-3-thiapentane, 1,3-bis(epithioethyl)cyclohexane, 1,4-bis(epithioethyl)cyclohexane, 1,3-bis(β-epithiopropyl)cyclohexane, 1,4-bis(β-epithiopropyl)-1,3-bis(β-epithiopropylthio)benzene, 1,4-bis(β-epithiopropylthio)benzene, 1,3-bis(β-epithiopropylthiomethyl)benzene, 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, 4,4'-bis(β-epithiopropylthio)biphenyl, vinylphenyl thioglycidyl ether, vinylbenzyl thioglycidyl ether, thioglycidyl methacrylate, thioglycidyl acrylate, allyl thioglycidyl ether, ethylene sulfide, propylene sulfide, thioglycidol, methyl thioglycidyl ether, ethyl thioglycidyl ether, propyl thioglycidyl ether and butyl thioglycidyl ether.

18. A process according to claim 1, wherein the sulfur-containing compound is bis(β-epithiopropyl)sulfide.

19. A process according to claim 17, wherein the at least one polar compound is selected from the group consisting of nitric acid, hydrochloric acid, perchloric acid, hypochlorous acid, chlorine dioxide, hydrofluoric acid, sulfuric acid, fuming sulfuric acid, boric acid, arsenic acid, arsenious acid, pyroarsenic acid, phosphoric acid, phosphorous acid, hypophosphoric acid, phosphorus oxychloride, phosphorus oxybromide, phosphorus trichloride, phosphorus tribromide, phosphorus pentachloride, cyanic acid, chromic acid, nitric anhydride, sulfuric anhydride, boron oxide, arsenic pentaoxide, phosphorus pentaoxide, chromic anhydride, sulfuryl chloride, silica gel, silica-alumina, silicic acids, tetrafluoroboric acid, sodium nitrate, magnesium sulfate, ammonium sulfate, phosphorus sulfide, sodium hydroxide calcium carbonate, formic acid, acetic acid, propionic acid, butyric acid, valeric acid, caproic acid, capric acid, naphthenic acid, methyl mercaptopropionate, oxalic acid, malonic acid, succinic acid, glutaric acid, adipic acid, maleic acid, cyclohexanecarboxylic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, benzylic acid, α-naphthalenecarboxylic acid, β-naphthalenecarboxylic acid, thiodipropionic acid, dithiodipropionic acid acetic acid, peracetic acid, thioacetic acid, tartaric acid, maleic anhydride, benzoic anhydride, phthalic anhydride, trimellitic anhydride, pyromellitic anhydride, trimethyl phosphates, triethyl phosphates, triisobutyl phosphates, tributyl phosphates, trilauryl phosphates, methyl dithiophosphate, phenol, catechol, t-butylcatechol, 2,6-di-t-butylcresol, 2,6-di-t-butylethylphenol, resorcinol, hydroquinone, phloroglucinol, pyrogallol, cresol, ethylphenol, butylphenol, nonylphenol, hydroxyphenylacetic acid, hydroxyphenylpropionic acid, hydroxyphenylacetamide, methyl hydroxyphenylacetate, hydrophenetyl alcohol, hydroxyphenetylamine, hydroxybenzaldehyde, phenylphenol, bisphenol A, 2,2'-methylene-bis(4-methyl-6-t-butylphenol), bisphenol F, bisphenol S, α-naphthol, β-naphthol, aminophenol, chlorophenol and 2,4,6-trichlorophenol, methanesulfonic acid, ethanesulfonic acid, butanesulfonic acid, dodecanesulfonic acid, benzenesulfonic acid, o-toluenesulfonic acid, m-toluenesulfonic acid, p-toluenesulfonic acid, ethylbenzenesulfonic acid, butylbenzenesulfonic acid, dodecylbenzenesulfonic acid, p-phenolsulfonic acid, o-cresolsulfonic acid, metanylic acid, sulfanilic acid, 4B-acid, diaminostilbenesulfonic acid, biphenylsulfonic acid, α-naphthalenesulfonic acid, β-naphthalenesulfonic acid, peri acid, Laurent's acid, phenyl J-acid, benzene, biphenyl, naphthalene, anthracene, phenanthrene, alkylbenzenes, styrene, α-alkylnaphthalenes, β-alkylnaphthalenes, α-vinylnaphthalene, β-vinylnaphthalene, phenyl esters, esters of benzoic acid, esters of salicylic acid, esters of phthalic acid, esters of isophthalic acid, esters of terephthalic acid, benzenesulfinic acid and toluenesulfinic acid.

20. A process according to claim 6, wherein the dipping is carried out at a temperature of 0 to 150° C.; the sulfur-containing compound is bis(β-epithiopropyl)sulfide; and the polar compound is sulfuric acid.

* * * * *